United States Patent [19]

Marshall et al.

[11] Patent Number: 5,070,493
[45] Date of Patent: Dec. 3, 1991

[54] WEDGE PRISM ASSEMBLY FOR OPTICAL INFORMATION STORAGE

[75] Inventors: Daniel R. Marshall; David K. Campbell; Bernard W. Bell, Jr.; David K. Towner, all of Boise, Id.

[73] Assignee: Hewlett-Packard Company, Palo Alto, Calif.

[21] Appl. No.: 355,738

[22] Filed: May 22, 1989

[51] Int. Cl.$^5$ .......................... G11B 7/00; G00J 1/20
[52] U.S. Cl. .................................. 369/112; 369/118; 369/44.23; 369/44.24; 250/201.5
[58] Field of Search ......................... 250/201.5, 201.3; 356/125, 126; 350/445; 369/44.42, 112, 118, 44.23, 44.24

[56] References Cited

U.S. PATENT DOCUMENTS

| | | | |
|---|---|---|---|
| 4,783,589 | 11/1988 | Ando | 369/44.42 |
| 4,804,835 | 2/1989 | Ando | 369/44.42 |
| 4,959,824 | 9/1990 | Ueda et al. | 369/44.14 |

Primary Examiner—Roy N. Envall, Jr.
Assistant Examiner—Nabil Hindi
Attorney, Agent, or Firm—E. F. Oberheim

[57] ABSTRACT

An optical assembly incorporating a wedge-shaped optically transparent prism, a 45 degree right isosceles triangular prism which has two thin film coated surfaces, a rhomboidal prism attached to the triangular prism, a second, smaller 45 degree right isosceles triangular prism attached to one end face of the rhomboidal prism and two planoconvex lenses attached to the combination of the rhomboidal and second triangular prisms is mounted within a housing. All of the optical components are cemented to the adjacent component utilizing a transparent optical cement to form an integral unit. Data and servo detector assemblies and a diode laser light source are mounted on the external surfaces of the housing to form a stationary optical assembly which provides the following functions: generates a collimated beam of light whose power output may be modulated electronically to perform read, write and erase functions; generates an electrical data signal derived from a portion of a returning light beam; and generates suitable electrical error signals for servomechanical control of radial and axial motion of a focused light spot on information storage media.

9 Claims, 6 Drawing Sheets

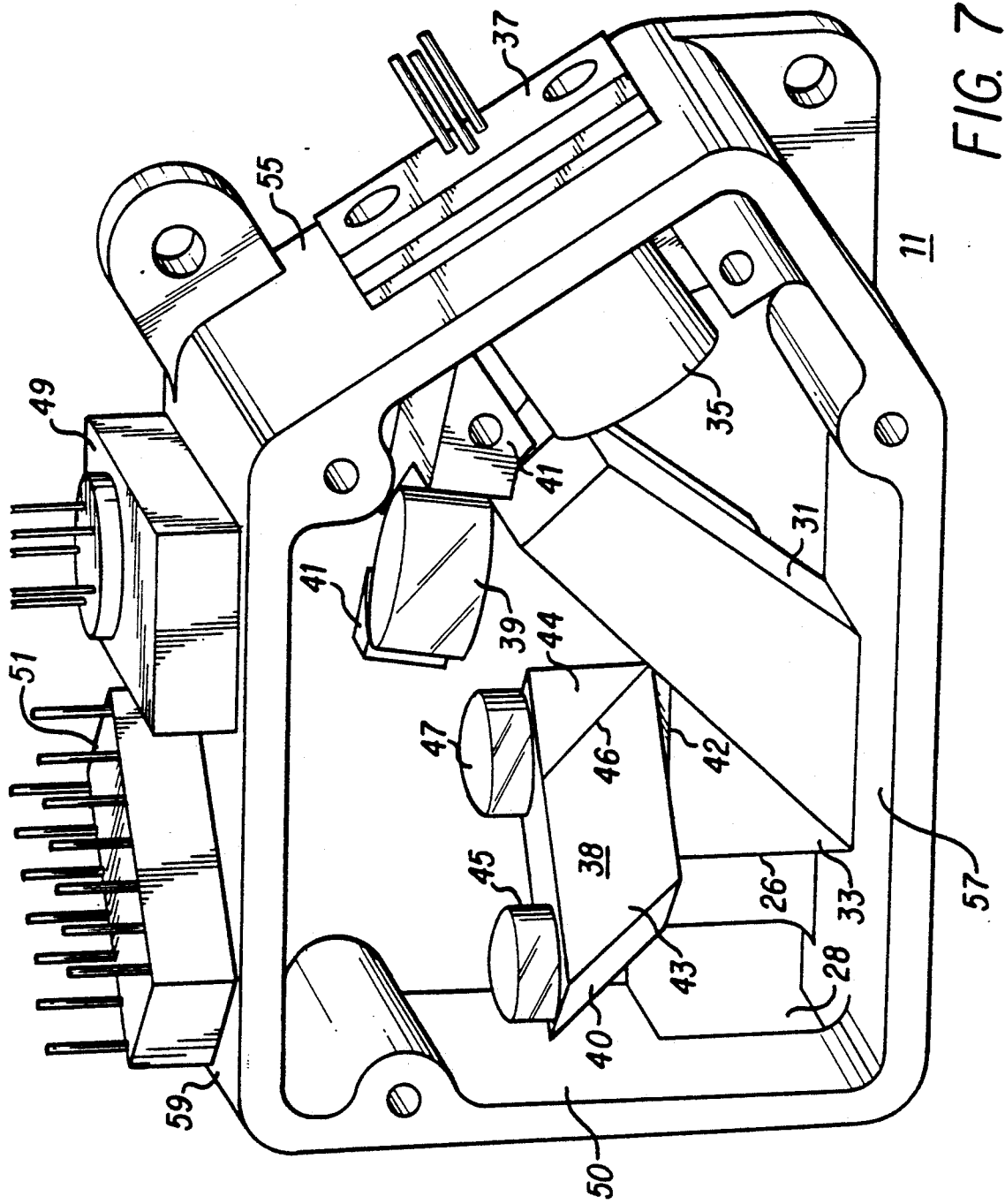

WEDGE PRISM ASSEMBLY FOR OPTICAL INFORMATION STORAGE

BACKGROUND OF THE INVENTION

The present invention relates to the field of optical and magneto-optical information storage systems and, more particularly, to portions of an optical assembly for applying a focused light beam to information storage media for recording or retrieving information optically.

Information storage systems, particularly those used with computer systems, typically store data magnetically or optically onto several types of storage media, rotating magnetic or optic disks for example. Such storage media may include those information memory media for document files, computer output memories and the like which are used for recording and retrieval only, or media which permit recording, retrieval and erasure of information. The data stored on such media, whether magnetic or optical, is contained within a series of tracks. Once formed on a disk, such tracks are spiral or concentric about the disk center and may number into the thousands of tracks per disk side. The total number of tracks and hence the storage capacity of the disk depends on the diameter of the disk utilized and the method of recordation, either magnetically or optically, of the data.

In both magnetic recording and magneto-optical recording, information is stored on a storage disk by orienting the magnetic field of the media at given points along given tracks. In order to record, access and read data on a disk, a read-write head or transducer for magnetic recording or an optical assembly comprising at least an objective lens in the case of magneto-optical recording is moved along a generally radial path across the surface of the storage disk as the storage disk is being rotated. The generally radial movement of the transducer or optical assembly will either follow a straight line path or an arcuate path, depending upon whether a linear or rotary actuator is utilized to position the head.

In magneto-optical storage, data are recorded and erased on a thin film of magnetic material which is deposited on a substrate of suitable material. In magneto-optical recording information is encoded and stored in a sequence of magnetic domains oriented normal to the storage media surface in either of two possible orientations, north pole up or north pole down for example. An erased track has all of its magnetized regions or domains oriented in one direction. Typically, on magneto-optic media, the magnetic force required to reverse or flip a magnetic domain from, for example, north pole down to north pole up, i.e., the coercive force required, varies greatly with the temperature of the media. At room temperature the coercive force necessary to reverse the magnetic domains is very high and therefore requires an extraordinarily large magnet. At approximately 150 degrees C. the coercive force required to reverse a magnetic domain decreases substantially and a domain may be flipped or reversed using ordinary magnets including electromagnets.

During a recording operation, a focused laser beam is used in a magneto-optic system to heat selected, localized spots on the recording media in a magnetic field. In this manner a point on the recording media can be heated, thereby lowering the coercive force required to write information and the magnet, depending on the direction of magnetic flux generated by such magnet, will cause the orientation of the magnetic domain to be reversed locally thereby recording the desired information. When the laser beam is turned off, the previously heated spot on the media cools, "freezing" the orientated domain in the desired orientation. To erase information so recorded the process need only be reversed; i.e., the point on the media will be heated by the laser beam and the direction of magnetic flux generated by the magnet will be such to reorient or reverse the magnetic domain.

In optical and magneto-optical recording and reading apparatus, an optical assembly is employed which applies the light beam to a data storage media. Such optical assemblies must meet a number of precisely defined needs which identify them as high precision devices when compared with common optical devices such as cameras, microscopes and the like. In this optical assembly a laser beam typically generated by a semiconductor laser or other suitable light source is focused on the storage medium by an objective lens. The light beam may be either reflected by the media or transmitted through the media. The laser beam when reflected from the media passes again through the objective lens and is then detected by a photodetector or other suitable detector. A detected signal is then processed to extract the information contained therein. A second function of the optical assembly is to derive tracking and focusing signals. Typically, prior art optical assemblies of this type are provided with a focusing servo mechanism to detect and maintain a focusing state for the objective lens and a tracking servo mechanism for detecting a tracking guide, continually directing the objective lens towards a desired track. Typical prior art optical assemblies can include large numbers of components and require a complex assembly and adjustment process and can be bulky and massive.

U.S. Pat. No. 4,783,589 issued on Nov. 8, 1988 and entitled "Focus and Tracking Detection Apparatus for Optical Head Employing Light Guide Means Having Different Radii of Curvature" describes an optical assembly for use with an optical memory. The described optical assembly includes optical means for directing a light beam to the optical storage media and means for separating the resultant light beam reflected from the optical storage media into first and second light beams. The optical assembly further includes first and second light beam emerging surfaces having different radii of curvature from which the first and second light beams emerge. While the described optical assembly is more compact and less bulky than other prior art optical assemblies, it is complex, requiring the first and second light beam emitting surfaces to have different radii of curvature and an additional lens to converge the resultant first and second light beams.

SUMMARY OF THE INVENTION

In accordance with the principles of the present invention, a fixed optical assembly which provides a collimated beam of light to a moveable objective lens assembly which directs the beam of light to the surface of an optical or magneto-optical storage media is provided. The fixed optical assembly of the present invention includes an optically transparent wedge formed by first and second plane surfaces. The first wedge surface provides anamorphic expansion and redirection of an elliptical beam of light to provide a nearly round collimated light beam to the moving objective lens and also provides redirection of a portion of the light beam reflected from the media disk. The second wedge surface is one of two surfaces which comprise a beamsplitter splitting the returning light beam reflected from the media surface into a data beam and a tracking/focusing or servo beam. The fixed optical assembly further includes means for generating data and tracking/focusing error signals. The central optical components of the optical assembly are bonded together in a wedge prism assembly to form an integral unit. The wedge prism assembly, associated lenses, detection means and light source are mounted in a suitable housing to form a compact and lightweight unit. The transparent wedge of the present invention provides both servo beam reflection and anamorphic expansion at its first surface while the second surface serves as part of a polarization beamsplitter and an exit window for the servo beam and eliminates the need for additional optical components and the necessity for aligning and mounting those components resulting in reduced cost, size, mass and complexity. Further, the use of transparent, refractive index matched cements to bond the separate optical components together eliminates the need for several antireflective coatings and maintains a stable relationship between the optical parts which is independent of the housing to which the optical assembly is mounted. Proper alignment between the optical components is therefore more easily and accurately maintained than with an extended structure of similar materials as is commonly found in prior art optical assemblies.

BRIEF DESCRIPTION OF THE DRAWINGS

FIG. 3b is a top view of the optically transparent wedge shown in FIG. 3a;

FIG. 7 is a perspective view illustrating the construction of a stationary optical assembly according to the principles of the present invention.

DETAILED DESCRIPTION OF THE PREFERRED EMBODIMENT

Figure 1:
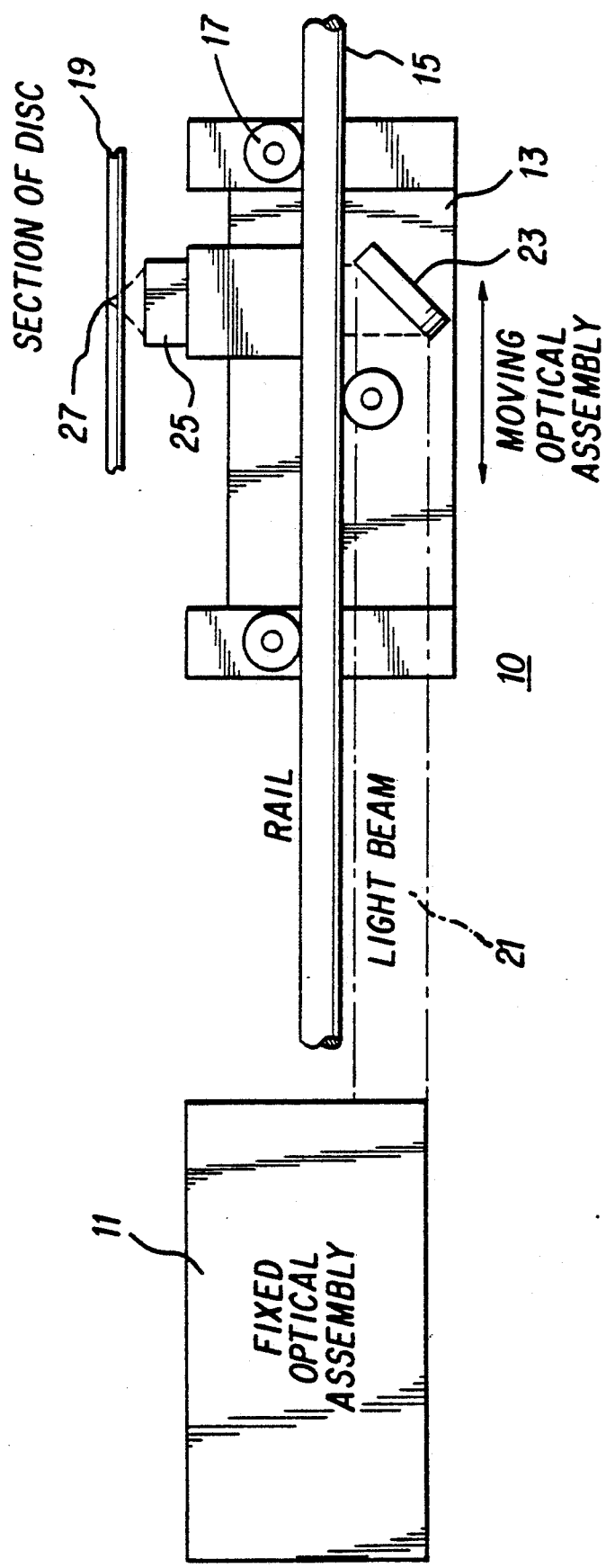
FIG. 1 is a conceptual block diagram of an optical recording system according to the principles of the present invention.

Referring now to FIG. 1, an optical system which directs a collimated light beam 21 onto an optic or magneto-optic storage disk 19 is shown. The optical system 10 is split into two assemblies, a stationary optical assembly which contains the bulkier, more massive and more electrically complex components and a moving optical assembly of minimum mass and maximum ruggedness which focuses a spot of light on the recording medium and moves this spot radially and axially as required. Although the preferred embodiment utilizes a split structure as described herein, both assemblies may be combined in a single moving optical assembly. The stationary optical assembly 11 which provides the collimated light beam 21 is mounted on the storage system frame or base (not shown). The moving optical assembly or actuator 13 which carries an objective lens 25 and a mirror 23 focuses the light beam spot 27 on the recording disk 19. In response to seeking and tracking commands, the actuator 13 moves transversely along rail 15 on rollers 17 moving the spot 27 across the disk 19 in a radial path. While FIG. 1 shows an optical system including a linear actuator 13, the optical system 10 may alternately employ a rotary actuator rather than the linear actuator 13. The recording disk 19 is typically fixed to a spindle which is driven by an external motor (not shown) to rotate the disk. The stationary optical assembly 11 typically includes the light source and the necessary detectors. The actuator assembly 13, objective lens 25, mirror 23 and appropriate electronic circuitry for controlling the electrical and mechanical components do not form part of the present invention and will not be further described here.

Figure 2:
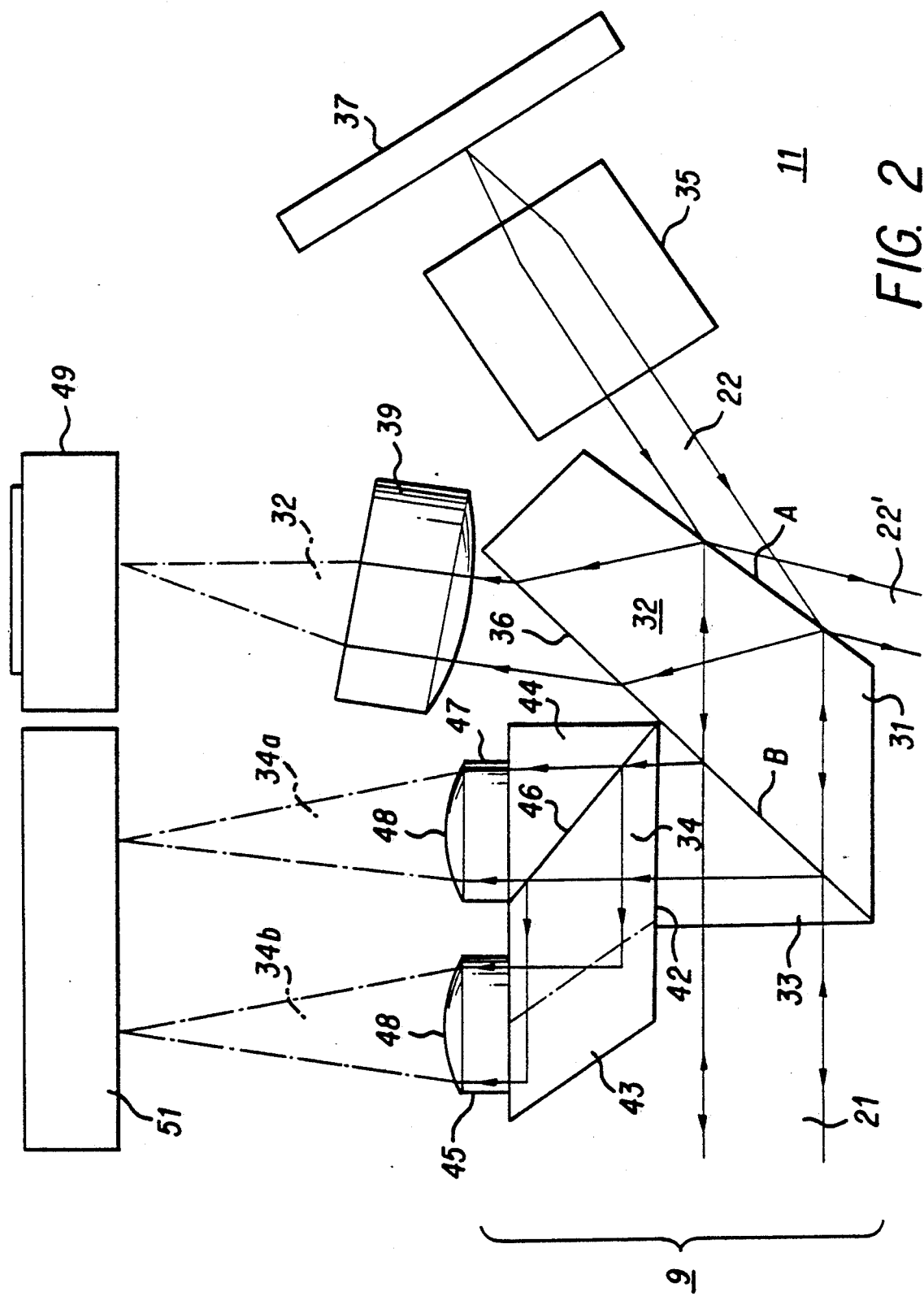
FIG. 2 is a schematic diagram illustrating the arrangement of the fixed optical assembly shown in FIG. 1.

Referring now to FIG. 2, a diagram of the arrangement of the components of stationary optical assembly 11 and illustrating the propagation of a light beam through the wedge prism assembly 9 is provided. The wedge prism assembly 9 comprises an optically transparent wedge 31, a 45 degree right isosceles triangular prism 33 bonded to the surface B of the transparent wedge 31, a rhomboidal prism 43 which is bonded to the exit surface 42 of prism 33, a smaller 45 degree right isosceles triangular prism 44 bonded to prism 43 at surface 46 and two planoconvex lenses 45 and 47 which are bonded to the exit surfaces of prisms 43 and 44, respectively. The planoconvex lenses 45, 47 may or may not have optical coatings on their convex surfaces 48. Each of the optical components in the wedge prism assembly 9 is bonded or cemented to its adjacent optical component utilizing a transparent optical cement (a transparent refractive index matching cement such as that manufactured by the Norland Company is suitable for this purpose). A light source 37 such as a semiconductor laser, emits a divergent elliptical light beam which is gathered and converted to a parallel or collimated beam 22 in collimating lens 35. Light beam 22 is incident on surface A of wedge 31 where a portion 22' of the beam is reflected and lost to the system and a portion 21 of the beam is transmitted through surface A. An entrance window is defined at that portion of surface A where the light beam 22 is incident and transmitted through surface A into the wedge 31. Surface A provides anamorphic expansion of light beam 22 to form the circular collimated beam 21 which passes through prism 33 to the objective lens 25 and hence is focused onto the disk 19 (as shown in FIG. 1). Light beam 21 is reflected by disk 19 back to prism 33 which in combination with surface B of wedge 31 and multilayer thin film optical coatings form a polarizing beamsplitter where the reflected light beam 21 is split into a data beam 34 and a tracking/focusing or servo beam 32. The servo beam 32 passes through surface B of wedge 31 and is incident on the internal side of surface A of wedge 31 to be reflected out of exit window 36 and through servo lens 39 to servo detector 49. The exit window 36 is defined as that portion of surface B through which the servo beam 32 exits the wedge 31. The data beam 34 passes through the exit window formed by the top surface 42 of prism 33 into prisms 43 and 44. Prisms 43 and 44 together with multilayer thin film optical coatings at surface 46 form a second polarizing beamsplitter splitting the data beam 34 into two complementary data beams 34a and 34b and guide the complementary beams through the planoconvex lenses 45 and 47 to the data detector assembly 51.

Referring now to FIGS. 3a and 3b and 4a and 4b, wedge 31 is a six-sided, wedge-shaped optically transparent prism of optical grade glass (Grade A fine annealed BK-7 is suitable for this purpose) formed by two plane surfaces denoted A and B. Surface A provides anamorphic expansion of light beam 22 incident on surface A. Control of the direction of beam 21 after transmission through surface B is achieved by attachment of an additional component such as prism 33 to surface B. Utilizing either thin-film optical coatings on surface B or prism 33, a polarization beamsplitter is formed and partial reflection at surface B splits the reflected beam 21 into two components, the data beam 34 and the servo beam 32. Reflection of beam 32 at the interior surface of surface A separates the servo beam 32 from the beam 21 in the wedge 31. A portion of surface B also serves as an exit window 36 for the servo beam 32 and is formed such that the servo beam 32 exits surface B at substantially Brewster's angle.

The dihedral angle α, indicated by reference numeral 53, formed by the extensions of surfaces A and B of wedge 31 controls (1) the anamorphic expansion ratio of surface A, (2) the reflectance R at surface A, (3) the angle of incidence of the servo beam 32 on the exit window portion 36 of surface B such that the servo beam 32 is transmitted through exit window 36 at substantially Brewster's angle and (4) the angle that the data beam 34 is reflected from surface B at the interface between the wedge 31 and prism 33. In the preferred embodiment, the dihedral angle 53 is optimized to provide a circular light beam 22 from the elliptical light beam 21 and to provide an angle of incidence at surface B for the servo beam 32 at substantially Brewster's angle. (At Brewster's angle reflection for P-polarized light vanishes and the need for an antireflective coating on surface B is eliminated.)

Figure 4A:
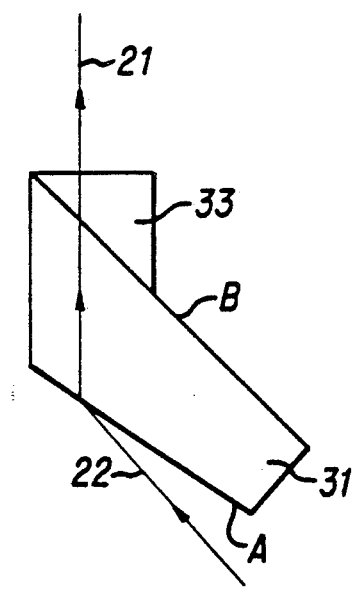
FIGS. 4a and 4b are schematic diagrams illustrating the optical path of the incident and reflected light rays through the transparent wedge shown in FIGS. 3a and 3b.
Figure 4B:
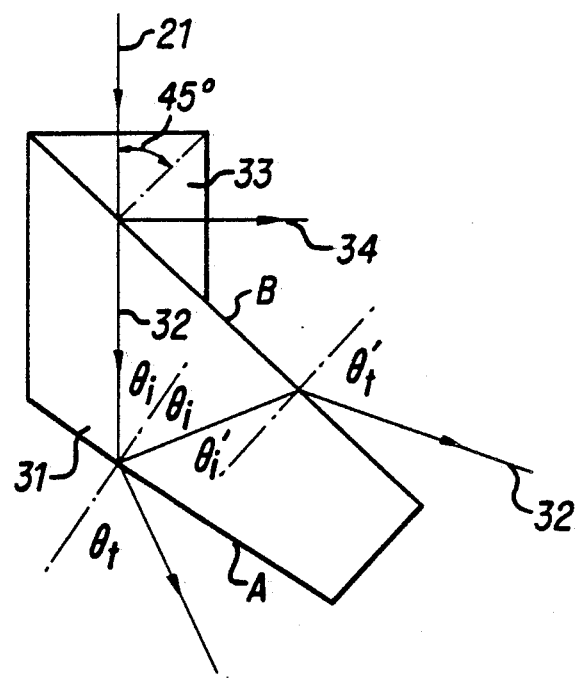

Referring now specifically to FIG. 4b an analysis of the servo beam portion 32 of the return light beam 21 utilizing Snell's law provides an expression to calculate and optimize the dihedral angle α (53). To simplify the geometry, the angle of incidence of the return beam 21 with surface B is taken at 45 degrees. Then, from Snell's law $$\sin \theta_t = n \sin \theta_i = n \sin(45° - \alpha) \quad (1)$$

where $\theta_i = 45° - \alpha =$ angle of incidence at surface A
$\theta_t =$ angle of transmission at surface A  (2)

and $$\theta_t' = \sin^{-1}(n \sin(45° - 2\alpha)) \quad (3)$$

$\theta_i' = 45° - 2\alpha =$ angle of incidence at surface B  (4)

$\theta_t' =$ angle of transmission at surface B.

From the Fresnel Reflectance Equations:

$$R_A = \frac{\tan^2(\theta_i - \theta_t)}{\tan^2(\theta_i + \theta_t)} \quad (5)$$

$$R_B = \frac{\tan^2(\theta_i' - \theta_t')}{\tan^2(\theta_i' + \theta_t')} \approx 0 \text{ for Brewster's Angle} \quad (6)$$

and for Anamorphic Expansion:

$$A_A = \frac{\cos\theta_i}{\cos\theta_t} \quad (7)$$

$$A_B = \frac{\cos\theta_i'}{\cos\theta_t'} \quad (8)$$

where
$R_A =$ reflectance at surface A
$R_B =$ reflectance at surface B and
$A_A =$ anamorphic expansion factor at surface A
$A_B =$ anamorphic compression factor at surface B.

Substituting equations (1) through (4) into equations (5) through (8) yields a set of 4 parametric design equations for $R_A$, $R_B$, $A_A$ and $A_B$ as explicit functions of the wedge dihedral angle α.

Figure 3A:
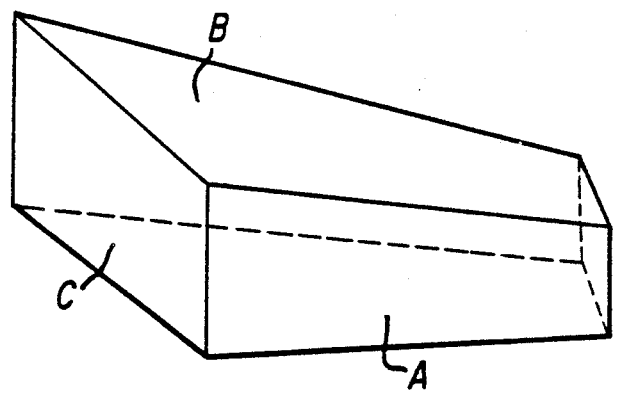
FIG. 3a is an isometric view of the optically transparent wedge of the present invention.
Figure 3B:
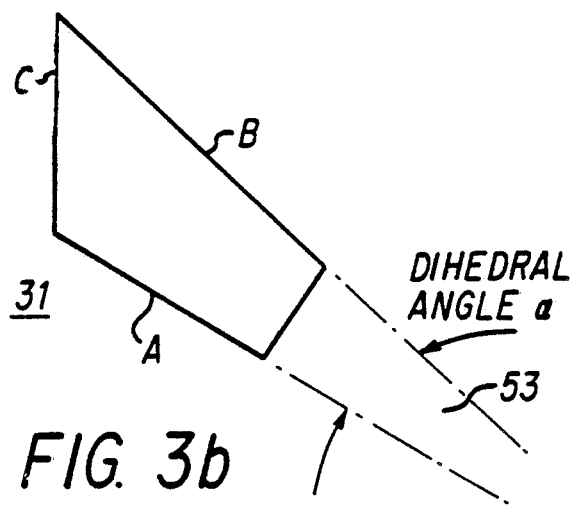
Figure 5:
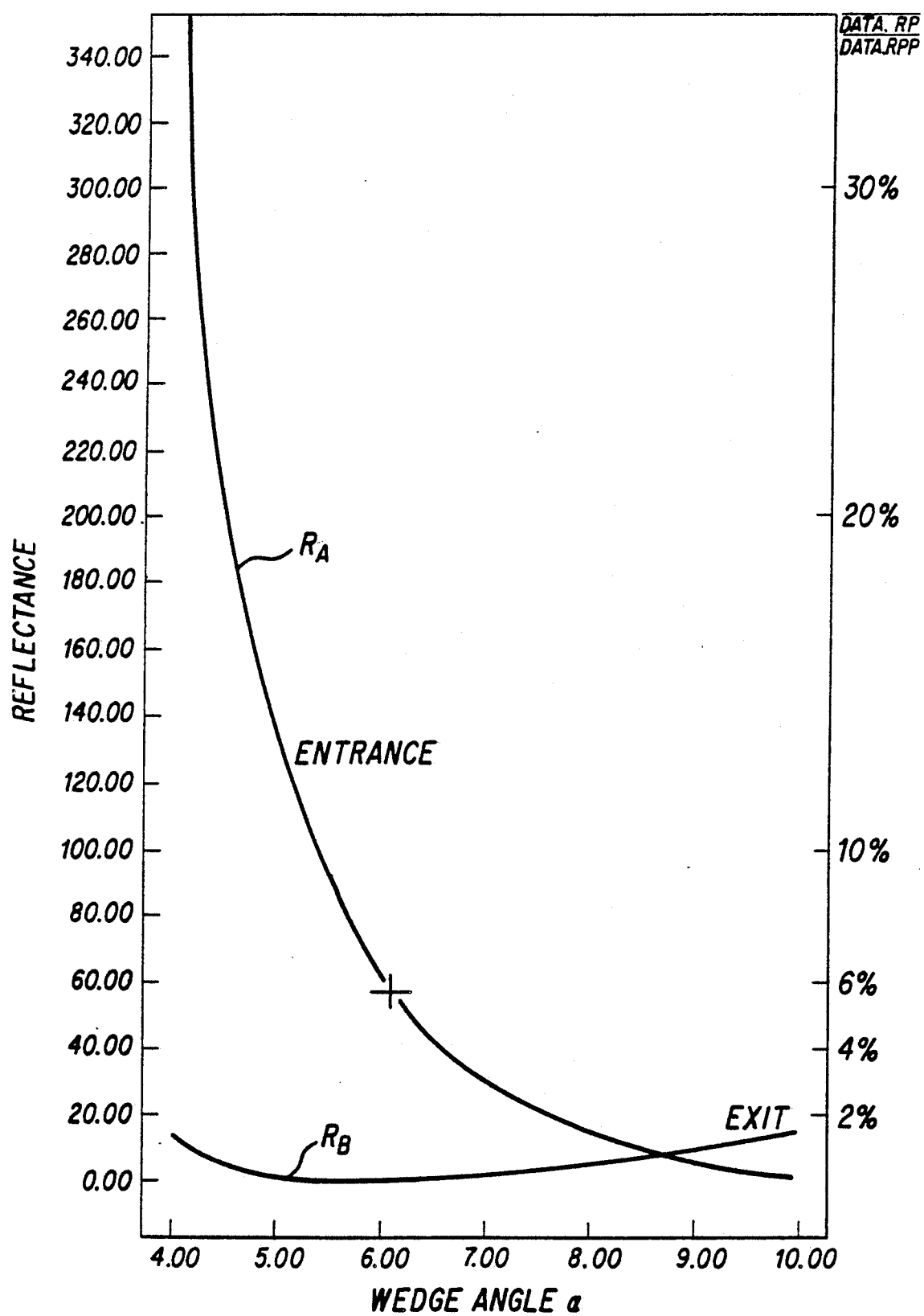
FIG. 5 is a graph illustrating the relationship between the wedge angle and the reflectance at surface A and surface B, respectively, of the transparent wedge shown in FIGS. 3a and 3b.
Figure 6:
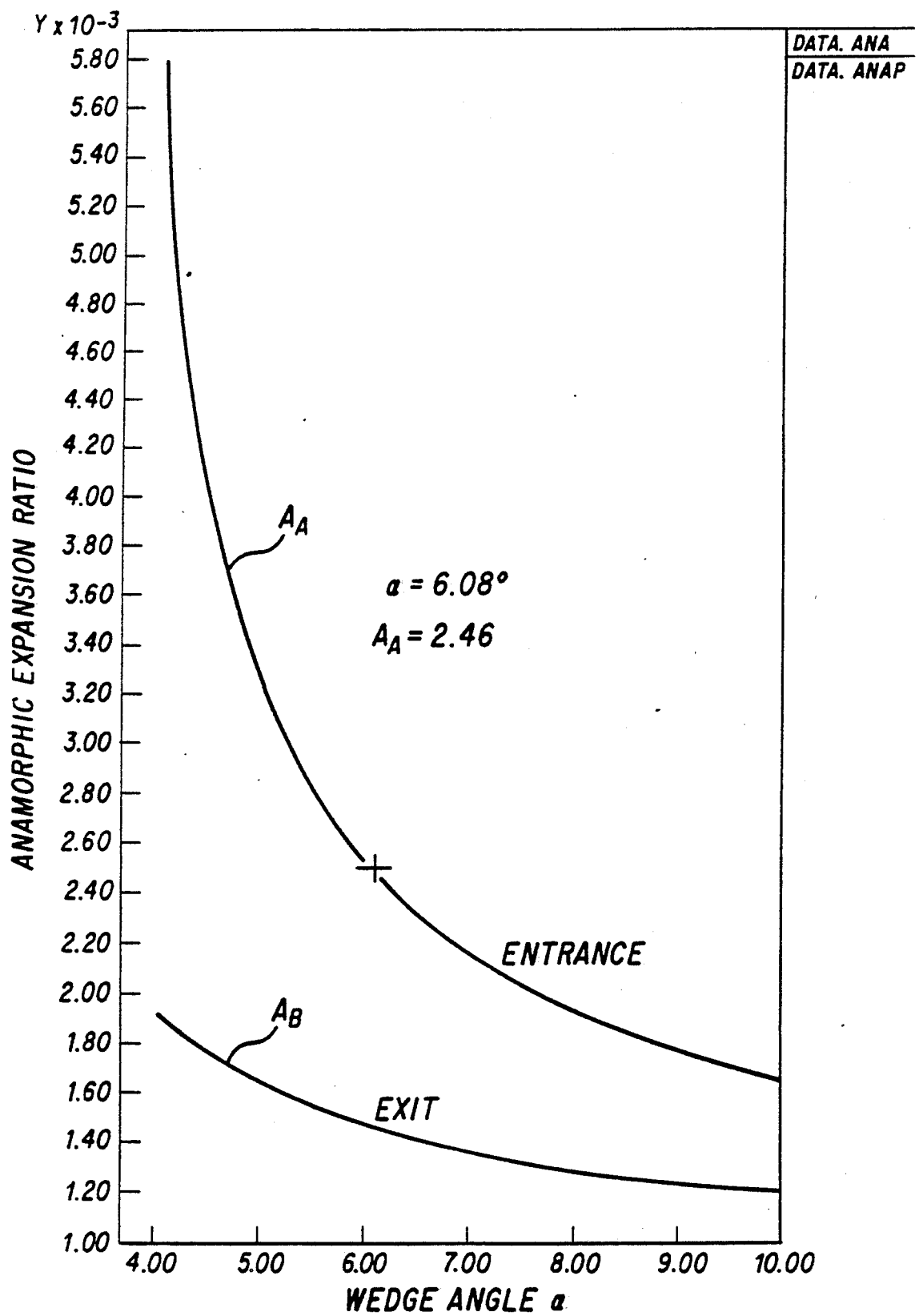
FIG. 6 is a graph illustrating the relationship between the wedge angle and the anamorphic expansion ratio at surface A and the anamorphic compression ratio at surface B, respectively, of the transparent wedge shown in FIGS. 3a and 3b.

Referring now also to FIGS. 5 and 6, FIG. 5 is a graph showing the relationship between the wedge dihedral angle α (reference numeral 53 as shown in FIG. 3b), for example at an angle of 6.08 degrees, and the reflectances $R_A$, $R_B$ at surface A and B, respectively, as defined by equations (5) and (6) above. FIG. 6 is a graph showing the relationship between the wedge dihedral angle α and the anamorphic expansion and compression factors $A_A$, $A_B$ at surfaces A and B, respectively, as defined by equations (7) and (8).

Referring now to FIG. 7, a stationary optical assembly 11 (as shown in FIG. 1) constructed according to the principles of the present invention is shown. The wedge prism assembly 9 (as shown in FIG. 2) is comprised of a six-sided, wedge-shaped optically transparent prism 31 and a 45 degree right isosceles triangular prism 33 cemented to the lower portion of surface B. The prism 33 has an antireflective coated exit window 42 to prevent light losses and spurious reflections into the servo detector 49. The hypotenuse of prism 33 is coated to form a low-extinction polarizing beamsplitter. The low-extinction coating reflects appropriate quantities of the reflected light beam 21 in the S— and P— states of polarization to provide a data beam 34 to the data detector assembly 51. Both of the thin-film optical coatings utilized on the exit window and hypotenuse surfaces of prism 33 are selected to control the phase shift between the S— and P— states of polarization to eliminate the necessity of a compensating birefringent element (phase compensating element) in the optical head. The rhomboidal prism 43 and a second 45 degree right isosceles triangular prism 44 are cemented together at interface surface 46. Prism 44 and prism 43 adjacent the interface surface 46 together with a multilayer thin film coating form a high-extinction beamsplitter which splits the data beam 34 into two complementary beams 34a and 34b (as shown in FIG. 2) which are detected by the data detector assembly 51. The remaining portion of the prism 43 forms a trapezoidal prism which folds the reflected data beam 34b back to the plane of the transmitted data beam 34. Optical coatings at the fold mirror 40 are not required because of total internal light reflection at this surface. The beamsplitter assembly 43,44 is mounted on and cemented to the exit window (upper surface 42) of the prism 33 at 45 degrees to the orthogonal axes of the wedge assembly 31,33 to provide for proper separation of the two data signals 34a, 34b thus generated. The 45 degree rotated mounting of the beamsplitter 8,44 eliminates the necessity for a ½ wave compensator plate to rotate the plane of polarization of the data beam 34 thus reducing cost and complexity and improving performance margins. A pair of planoconvex lens 45,47 are mounted on the exit surfaces of the prism assembly 43,44 to focus and direct the complementary data beams 34a, 34b to the data detector assembly 51.

The wedge prism assembly 9 is mounted on and cemented to an internal surface 57 of an enclosure or housing 50. The housing 50 is a conventional cast or molded metal or plastic part which maintains all of the optical and other components of the optical head in alignment and in the proper relationship to each other. Since the components of the wedge assembly are cemented or otherwise bonded together, the structural requirements on the housing 50 are substantially reduced relative to a design in which the housing also is required to maintain alignment of and positional relationships between the central optical components. The housing 50 also provides a mounting site for the collimating lens 35 and mounting brackets 41 for the servo lens 39. The collimating lens 35 is a commercially available component and converts the diverging elliptical light beam emitted by the light source 37 into a collimated beam. The light source 37 comprises a standard, commercially available diode laser and is mounted on an external surface 55 of the housing 50 opposite the collimating lens 35. An aperture is provided through the housing wall to allow the laser beam to pass through to the collimating lens 35. The aspect ratio of the laser's divergent far-field radiation pattern is matched to the expansion ratio of the anamorphic surface (surface A) of the wedge 31, so that the light beam 21 exiting the wedge 31 is nominally circular. The housing 50 has an aperture 28 formed in a wall or corner opposite the wedge assembly prism 33 face 26 to allow the transmitted and reflected light beam 21 to exit and enter the housing 50. The servo lens 39 is a commercially available component and is internally mounted in housing 50 in brackets 41 and focuses and directs the servo beam 32 to the servo detector 49. The servo detector 49 is mounted on an external surface 59 of the housing 50 opposite the servo lens 39. An aperture (not shown) is provided through the housing wall to allow the servo beam to be incident on the servo detector. The servo detector assembly 49 generates both tracking and focus error signals. Any of several well-known servo detection techniques may be used for this application. The data detector assembly 51 is mounted on an external surface 59 of the housing 50 opposite the pair of planoconvex lens 45 and 47. Apertures (not shown) through the housing wall are provided to allow the data beams 34a, 34b to be incident on the data detectors. The data detector assembly 51 is conventional in nature and includes two detectors a data signal derived from the changing polarization state of the data beams.

We claim:

1. an optical apparatus for recording information on an optical storage media and reproducing information therefrom comprising:
    an optical assembly having a first optical surface and a second optical surface opposed to said first optical surface and defining an angle α therebetween;
    a light source for generating a collimated light beam incident at an angle on said first optical surface;
    said light beam passing through said first optical surface into said optical assembly and exiting said optical assembly at a first location on said second optical surface and passing to said media, the returned light beam reflected from said media being incident upon and passing through said second optical surface at said first location into said optical assembly and being incident upon and reflected from the internal side of said first optical surface to the inner side of said optical surface at a second location and exiting said optical assembly at said second location;
    said angle α between said first and second optical surfaces being set at a pre-determined value for simultaneously controlling the anamorphic expansion ratio for said collimated light beam incident on the external side of said first opticals surface, the angle of reflection of said returned light beam, now the reflected returned light beam, from the internal side of said first optical surface, and the angel of incidence of the reflected returned light beam on the internal side of said second optical surface at said second location at substantially Brewster's Angle.

2. An optical apparatus as in claim 1 further including a triangular prism having an entrance surface, an exit surface and a hypotenuse surface, adjacent to and in contact with a portion of said second optical surface at said first location, a multi-layer thin film optical coating disposed therebetween forming a beam splitter interface for splitting said returned light beam into a data beam and a servo beam said data beam reflected from said interface thorough said exit surface and said servo beam transmitted through said interface into said optical assembly and incident on and reflected from the internal side of said first optical surface to and through said second optical surface at said second location.

3. An optical apparatus as in claim 2 further including:
    data detector means for generating data signals derived from said data beam, said data beam optically coupled to said data detector means; and
    servo detector means for generating servo error signals derived from said servo beam, said servo beam optically coupled to said servo detector means.

4. An optical assembly for generating a collimated light beam and receiving a returning light beam for use in an optical information storage system, said optical assembly comprising:
    a housing for enclosing and mounting optical components of said optical assembly;
    an optical prism assembly comprising a six-sided, wedge-shaped prism having first and second opposing plane surfaces, the extensions of which define a dihedral angle, said wedge-shaped prism having a base side formed in a predetermined angular relationship with said first and second plane surfaces, a first triangular prism fixedly attached to a portion of said second plane surface adjacent said base side, said first triangular prism having an entrance surface, an exit surface and a hypotenuse surface, said hypotenuse surface of said first triangular prism being bonded to a portion of said second plane surface adjacent said base side, an optical coating disposed on one of said bonded surfaces thereby forming a first beamsplitter, a rhomboidal prism fixedly bonded to the exit surface of said first triangular prism, said rhomboidal prism having opposed plane surfaces forming an entrance surface and an exit surface and two additional opposed plane surfaces non-perpendicular to said entrance and exit surfaces, said entrance surface adjacent and in contact with said first triangular prism exit surface and a second triangular prism having an exit surface and a hypotenuse surface, said hypotenuse surface adjacent to and bonded to one of said additional non-perpendicular plane surfaces, said one additional plane surface being the first incident plane surface for a light beam reflected from said first beamsplitter after entering said rhomboidal prism, said bonded area of contact including an optical coating on one of said adjacent surfaces thereby forming a second beamsplitter, said optical prism assembly mounted to an internal surface of said housing on said base side;

a light source for generating a light beam, said light source mounted on said housing;

data detector means mounted on said housing for generating data signals from a data beam; and tracking and focus detector means mounted on said housing for generating tracking and focus error signals from a servo beam.

5. An optical assembly as in claim 4 wherein said dihedral angle is set at a predetermined value such that said first surface simultaneously provides an acceptable anamorphic expansion factor, reflectance and angle of reflection such that said returning light beam incident on said first surface is reflected from said first surface and is incident on a portion of said second surface at substantially Brewster's Angle.

6. An optical assembly as in claim 15 wherein said rhomboidal prism and said second triangular prism combination is oriented at a predetermined mounting angle with respect to the orthogonal axes of said wedge-shaped prism.

7. An optical assembly as in claim 6 wherein said predetermined mounting angle is substantially 45 degrees.

8. An optical assembly as in claim 6 wherein said light source is mounted on an external surface of said housing.

9. An optical system for generating a data beam and a servo beam from a light beam reflected from an optical recording media, comprising:

an optical prism having first and second opposed optical surfaces defining an angle therebetween;

beam splitter means forming a beam splitter interface at a first location on said second optical surface;

means for coupling a collimated beam of light to said first optical surface for transmission through said surface and through said optical prism and through said beam splitter means to said media;

the return light beam, reflected from said media, comprising a data beam component reflected at said interface and transmitted from said beam splitter, and a servo beam component transmitted into said optical prism across said interface;

said servo beam component incident upon the internal side of said first optical surface and reflected therefrom and by reason of said angle between said first and second optical surface being incident upon the internal side of said second optical surface at substantially Brewster's Angle, at a second location removed from said first location, whereat said servo beam component is transmitted from said optical prism.

* * * * *